J. C. HAYES.
HOSE COUPLING.
APPLICATION FILED APR. 9, 1913.
1,085,606.
Patented Feb. 3, 1914.
2 SHEETS—SHEET 2.
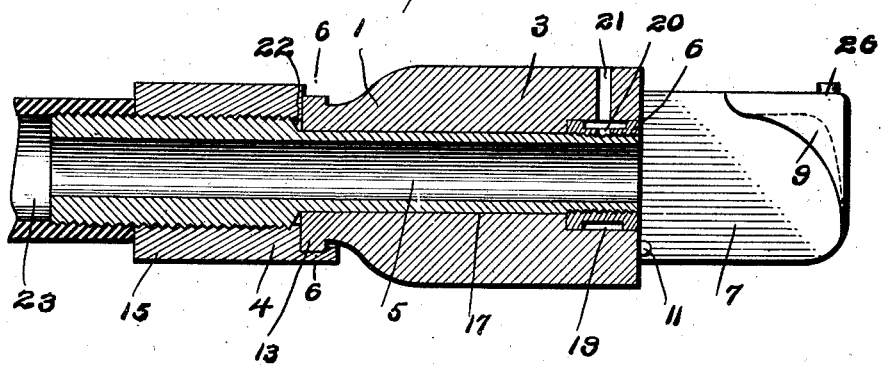
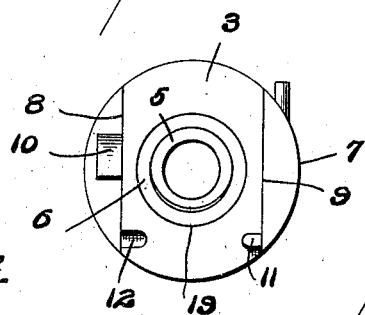
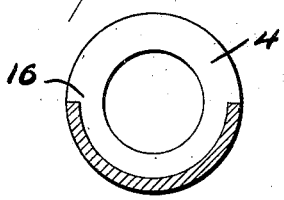
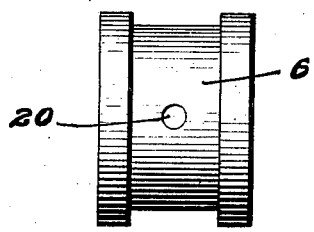
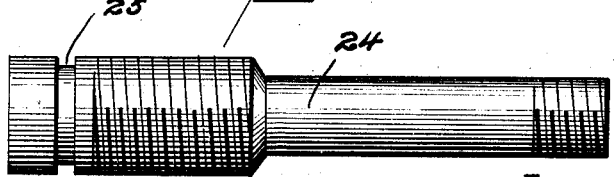
Witnesses
H. Strauss
C. R. Ziegler.
Inventor
James C. Hayes
By Joshua R. H. Potts.
Attorney

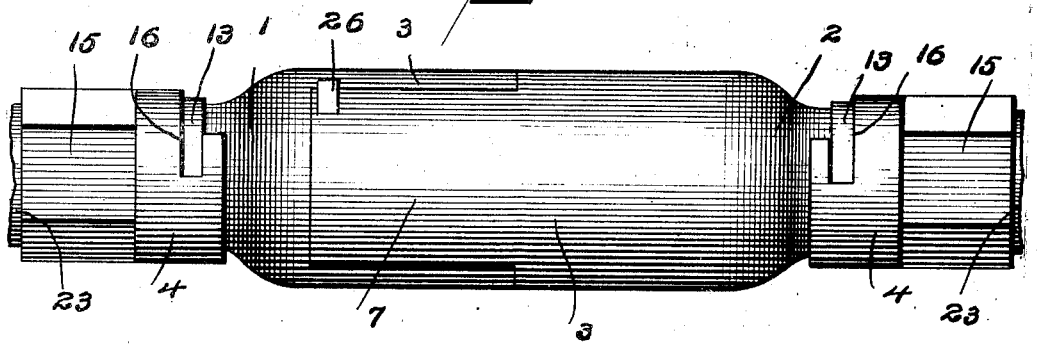
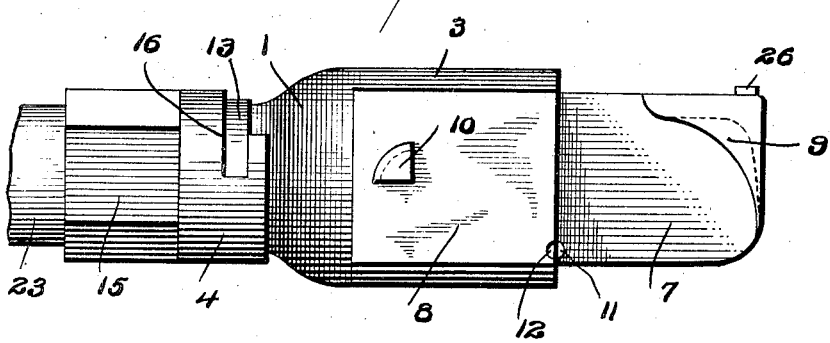
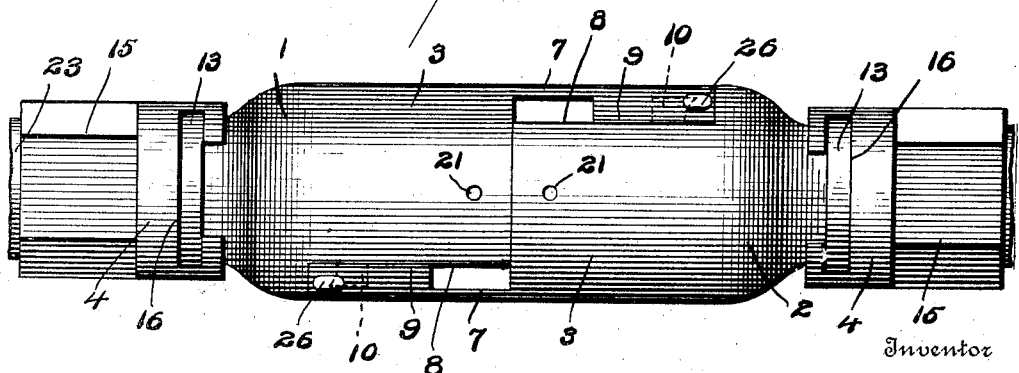

UNITED STATES PATENT OFFICE.

JAMES C. HAYES, OF BROOKFIELD, MISSOURI.

HOSE-COUPLING.

1,085,606.   Specification of Letters Patent.   Patented Feb. 3, 1914.

Application filed April 9, 1913. Serial No. 759,887.

*To all whom it may concern:*

Be it known that I, JAMES C. HAYES, a citizen of the United States, residing at Brookfield, in the county of Linn and State of Missouri, have invented certain new and useful Improvements in Hose-Couplings, of which the following is a specification.

My invention relates to improvements in hose couplings, the object of the invention being to provide a hose coupling which may be quickly coupled and uncoupled, which will be steam tight when the members are together, and which may be readily taken apart and repaired when desired.

A further object is to provide a hose coupling with an improved arrangement of coupling head, draw nut, internal pipe, and gasket, by means of which the gasket may be properly positioned and removed and replaced when desired.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improved hose coupling. Fig. 2 is a view in side elevation of one member of the hose coupling. Fig. 3 is a top plan view of the construction shown in Fig. 1. Fig. 4 is a view in longitudinal section of one of the coupling members. Fig. 5 is an end view of one of the coupling members. Fig. 6 is a view in section on the line 6—6 of Fig. 4 illustrating the draw nut only. Fig. 7 is a view in side elevation of a gasket. Fig. 8 is a view in elevation of a slightly modified form of tube.

My improved coupling comprises two members 1 and 2 which are precisely alike in construction, yet reversely positioned, so that they effectually couple when together. The description of one member will apply alike to both.

Each coupling member comprises a coupling head 3, a draw nut 4, a coupling tube 5, and a gasket 6, constructed and assembled as will now be explained. The head 3 is circular in cross section and cylindrical throughout the greater portion of its length, and at one side is provided with an extension 7 adapted to be positioned against a flat side 8 of the other member. Each extension 7 has a dove-tailed locking flange 9 adapted to interlock with a dove-tailed lug 10 on the flat surface 8, so that when the two members are placed together with the extensions of the members beside the flat faces of the members and moved laterally, the locking flanges 9 constitute cams in engagement with the lugs 10 to move the members longitudinally toward each other, and draw their meeting ends together.

Integral lugs 11 on each member, when the two members are drawn together, are projected into recesses 12 in the other member to prevent the members falling apart when once coupled together. In imparting the necessary movement to the members to cause them to interlock, they are positioned angularly with relation to each other, and then forced into alinement, the lugs 11 acting to hold the parts against lateral movement during this operation.

The head 3 of each coupling member, at its rear end, is reduced in diameter and formed with an annular flange 13 which has swiveled connection with the draw nut 4 above referred to.

The draw nut 4 is made hexagonal at one end as shown at 15 for the reception of a wrench to turn the same, and at its other end is cylindrical and recessed in one side as shown at 16 to allow the flange 13 a ready entrance into the nut.

The metal tube 5 above referred to is of two external diameters, the larger external diameter screw-threaded and engaging internal threads in the draw nut 4. The smaller diameter of the tube 5 fits snugly within the bore 17 of the head 3, and at its extreme end is externally screw-threaded engaging internal threads in the gasket 6. This gasket 6 is located within a recessed seat 19 in the outer end of the coupling head and is provided with an opening 20 to aline with an opening 21 in the head and receive a pin (not shown) to hold the gasket against rotary movement and allow the tube 5 to be unscrewed therefrom so as to permit the removal of the gasket and a new one to be substituted therefor.

The arrangement of the draw nut 4, tube 5, and head 3, it will be observed, by the turning of the draw nut, operates to move the head 3 longitudinally on tube 5, and as above set forth, this tube 5 is of two external diameters so that a shoulder 22 is formed at the juncture of the two diameters which shoulder bears against the end of head 3 and binds the parts securely together.

In Fig. 4 I show a hose connection 23 screwed onto the end of tube 5, but instead of employing this form of tube 5, I might employ a tube 24 illustrated in Fig. 8 in which form the larger diameter of the tube is provided with an annular groove 25, so that any ordinary form of hose may be readily clamped to this tube.

The free end of each extension on its upper edge is formed with a lug or raised portion 26, and various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A hose coupling, comprising two members, said members having interlocking engagement with each other, each member comprising a head, a draw nut, and a coupling tube externally screw-threaded at both ends, the threads at one end engaging the threads of the nut, and said nut having swiveled connection with the head, said head at its outer end having a gasket seat therein, an internally screw-threaded gasket located within the seat and engaging the screw-threads on the other end of the tube, and said gasket and head having registering openings, substantially as described.

2. A hose coupling comprising two members having interlocking engagement with each other, each member comprising a coupling tube threaded at both ends and a shoulder intermediate its length; a head slidably mounted on said tube and having an annular recess in one end; a gasket in said annular recess, and threaded on one of the threaded ends of said tube, said gasket and head having registering openings; a nut threaded on the other end of said tube and swiveled to said head, substantially as described.

3. A hose coupling comprising two members each having interlocking engagement with the other, each member comprising a coupling tube threaded at both ends and a shoulder intermediate its length; a head slidably mounted on said tube, provided with an annular rib on one end and having an annular recess in its other end; a gasket in said annular recess and threaded on one of the threaded ends of said tube, said gasket and head having registering openings; a nut threaded on the other end of said tube, said nut being provided with an internal annular groove in engagement with the annular rib on said head; and a recess in one side permitting the engagement and disengagement of said rib and groove, substantially as described.

In testimony whereof I have signed my name to this specification in the presence of two subscribing witnesses.

JAMES C. HAYES.

Witnesses:
E. M. LOMAX,
W. W. MARTIN.